Sept. 4, 1956　　　A. R. VAN C. WARRINGTON　　　2,761,999
ELECTRICAL RELAYS

Filed Aug. 31, 1953　　　　　　　　　　　　　　2 Sheets-Sheet 1

United States Patent Office 2,761,999
Patented Sept. 4, 1956

2,761,999

ELECTRICAL RELAYS

Albert Russell van Cortlandt Warrington, Stafford, England, assignor to The English Electric Company Limited, London, England, a British company Application August 31, 1953, Serial No. 377,660

Claims priority, application Great Britain September 5, 1952

5 Claims. (Cl. 317—156)

This invention relates to electrical relays having shaded pole motor drives. Such relays impart a force to an armature such as an induction disc and ideally this force increases in proportion to the square of the strength of the current passing through an energizing coil. If the disc is mounted so as to be free to rotate and a certain distance of movement causes the relay to operate then this will lead to an inverse relationship between the magnitude of the current and the time required for the relay to operate. In some applications of this type of relay it is desirable that this relationship be not truly inverse, and there are applications in which it is necessary that the relay operates in a definite time at high currents and others in which the operation is much more rapid than with a truly inverse relationship at high currents. In other words, there are applications for time overcurrent relays in which the operating characteristic is not truly inverse and this invention is particularly concerned with means whereby a relay can be constructed to have an operating characteristic which deviates from a truly inverse one. The scope of the invention also extends to the application of these means to cause an operating characteristic to be more nearly a truly inverse one if for some reason, such as a tendency for the magnetic core to saturate at high current operations, there is an undesirable deviation from the truly inverse characteristic.

In the present invention the characteristic of an electrical relay having shaded pole operating means is adjusted by means of a capacitor which is connected across a coil embracing a shaded pole. The use of capacitors in combination with coils to form a circuit for a shaded pole has been disclosed in the prior art for cases in which the capacitor and coils have formed a circuit tuned to a harmonic of an energizing current, and the shaded pole has been used to restrain the action of an independent shaded pole drive having the conventional shading disc around the shaded poles. Both the construction and applications of this latter system differ from those of the present invention.

According to the invention, an electrical relay comprises an electro-conductive armature, shaded pole induction means for driving said armature, and an electro-magnetic system for energizing said induction means, the shading circuit of said induction means having a capacitor connected in series with a coil embracing said pole, which capacitor has a capacitance at an operating frequency of the relay which is greater than the inductance of the coil, whereby a current in said shading circuit has a leading phase with respect to an E. M. F. induced in the coil and the phase lead increases as the pole saturates on high energizing currents.

According to a feature of the invention, said shaded pole induction means comprise a magnetic core having two pairs of poles, one pair of which form a magnetic flux path which is shaded and the other pair of which form a magnetic flux path which is unshaded, said capacitance having a value which causes the phase difference between the magnetic flux in the shaded path and that in the unshaded path to increase towards 90° as the above-mentioned phase lead increases.

According to an alternative feature of the invention, said shaded pole induction means comprise a magnetic core having two pairs of poles, one pair of which form a magnetic flux path which is shaded and the other pair of which form a magnetic flux path which is unshaded, said capacitance having a value which causes the phase difference between the magnetic flux in the shaded path and that in the unshaded path to have an initial value of 90° when said pole is unsaturated.

In order that the invention may be well understood the above and other features will be described with reference to the accompanying drawings in which.

The scope of the present invention is best indicated by describing a series of examples embodying the invention.

Figure 1:
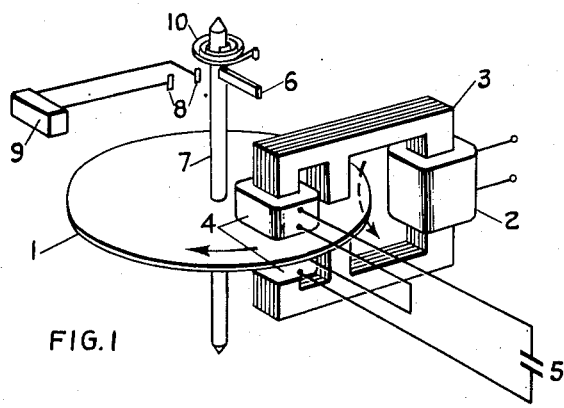
Fig. 1 shows diagrammatically a perspective view of a shaded pole drive having a shading coil capacitor combination.

In Fig. 1, a torque is imparted to an induction disc 1 by virtue of the electromagnetic action caused by a shaded pole motor drive. The full arrow indicates the direction of rotation of the disc when energizing coil 2 carries a current. A single magnetic core assembly 3 has two pairs of poles, one pair of which is unshaded and another pair of which is provided with coils 4 connected in series and to capacitor 5. In operation, the energization of coil 2 causes disc 1 to rotate and this moves the contact arm 6 which forms a rigid attachment to the spindle 7 and disc 1 so that after a period the contact arm 6 reaches contacts 8 and completes a circuit 9. Restoring means 10 are provided to reset the relay after coil 2 has been de-energized as a consequence of some action related to circuit 10 such as the performance of a tripping of a switch in a system protected by the relay.

The time $t$ which it takes for the relay to operate as a consequence of the energization of coil 2 depends upon the current $I$ in coil 2. The drive torque acting on the disc is theoretically proportional to the square of the current. The restraint torque acting on the disc depends upon magnetic damping effects, frictional effects and the ineritia of the disc itself. If magnetic damping is the predominant factor the operating time of the relay will be inversely proportional to the drive torque. The operating characteristic may then be expressed in the form $I^2t=K$, where K is some constant of the system. On the other hand, if there is little magnetic restraint, as there may well be if the relay is designed to operate at a high speed, the actual characteristic may be more nearly represented by the expression $It=K$. Such an expression may be obtained where saturation effects occur. In a particular application in which heating (which is a function of $I^2$) is the criterion of any protective action the theoretical characteristic of the form $I^2t=K$ may be desirable. With this in view a full stacking of the laminations in core 3 is used to reduce the tendency to saturate at high current. In spite of the full stacking of iron, saturation will still occur at some currents and this will tend to make the characteristic less inverse. To prevent this the value of the capacitor 5 may be chosen so that the phase shift of the flux in the shaded pole approaches 90° from the flux in the unshaded pole as the core saturates. This increases the torque at high currents to compensate for the effect of saturation, and can be made to more than compensate for it so that instead of a characteristic $It=K$ which would be obtained with no saturation, a curve $I^2t=K$ can be approached by this means.

On the other hand, a relay having a constant time of operation at high overcurrents may be desired, and this can be obtained in the following way.

Figure 2:
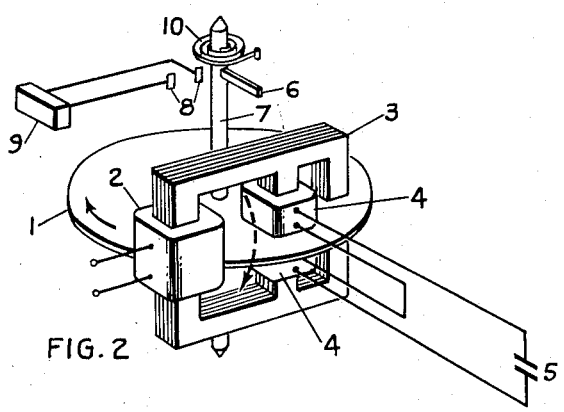
Fig. 2 shows diagrammatically a perspective view of a shaded pole drive having a shading coil capacitor combination but arranged to produce a different relay characteristic due to flux leakage effects.

In Fig. 1 the broken arrow depicts a path of leakage flux across the horizontal side arm of the magnetic core. Some of this flux supplements the action of the flux through the unshaded poles to cause an extra torque and as it increases with the current it tends to make the relay characteristic more inverse. When the core is situated in the position shown in Fig. 2 the opposite effect is obtained and the leakage flux provides a restraining torque which increases at a high current as the magnet saturates and hence makes the curve more definite. Thus it is possible to modify the characteristic by suitably positioning the shaded core. To enhance this effect, leakage at the higher currents may be increased by designing part of the core so that it readily saturates. Thus, if the section of the core in the energizing coil 2 is reduced so that saturation is reached in this part of the magnetic circuit and also the capacitor 5 is chosen so that a 90° phase difference between the fluxes in the shaded and unshaded poles occurs at a low energizing current but also due to the early saturation the phase is reduced as the current increases, the above-mentioned leakage flux effect can be used to make the relay characteristic less inverse. The effect of the capacitor adds the extra compensation required to make the relay characteristic correspond to a very constant operating time at medium and high overcurrents.

Figure 3:
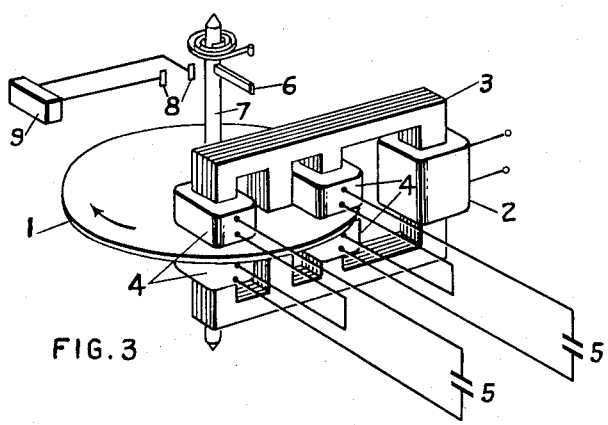
Fig. 3 shows diagrammatically a perspective view of a shaded pole drive having three pairs of poles.

It is possible to accentuate the above effects and make the relay characteristic even less or even more inverse by using a core assembly having three pairs of poles such as is shown in Fig. 3. The same reference numerals apply to Figs. 2 and 3 as apply to Fig. 1.

In this case there are two shaded pairs of poles 4 connected to capacitors 5 so that a non-linear restraining torque is applied to induction disc 1 due to the action of one pair of shaded poles in addition to the non-linear operating torque due to the other pair of shaded poles and the sizes of the capacitors 5 are such that the torque due to the poles providing the restraint decreases with increasing energizing current in a relay having a definite time characteristic but increases with the energizing current in a relay having a very inverse characteristic. Another combination is to put the capacitor in series with a wound shading coil on the pair of shaded poles providing the restraint and use an ordinary copper shading ring on the other pair of shaded poles.

Figure 4:
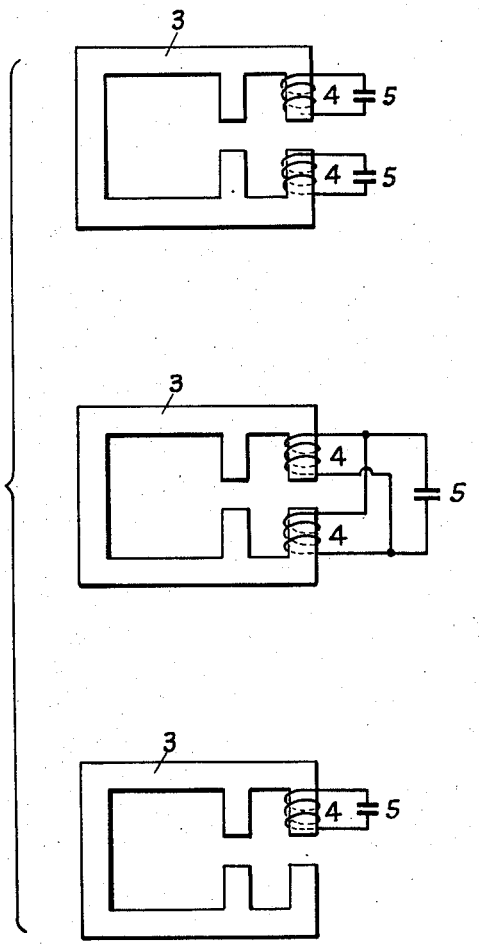
Fig. 4 shows various alternative connections of the capacitors to the coils in the shading circuits.

In the embodiments described above the arrangement of the capacitors in combination with the shading coils shows two coils connected together in series and in series with a capacitor. It is noted that the scope of the invention is not limited to such a combination but includes all equivalent combinations of which those shown in Fig. 4 are some examples. For instance, one of the shaded poles may have a copper ring and the other a tuned winding, and these need not necessarily be opposite to each other.

What I claim as my invention and desire to secure by Letters Patent is:

1. An electrical relay comprising an electro-conductive armature, shaded pole induction means for driving said armature, and an electro-magnetic system for energizing said induction means, the shading circuit of said induction means having a capacitor connected in series with a coil embracing said pole, which capacitor has a capacitance at an operating frequency of the relay which is greater than the inductance of the coil, whereby a current in said shading circuit has a leading phase with respect to an E. M. F. induced in the coil and the phase lead increases as the pole saturates on high energizing currents.

2. An electrical relay according to claim 1, wherein said shaded pole induction means comprise a magnetic core having two pairs of poles, one pair of which form a magnetic flux path which is shaded and the other pair of which form a magnetic flux path which is unshaded, said capacitance having a value which causes the phase difference between the magnetic flux in the shaded path and that in the unshaded path to increase towards 90° as the above-mentioned phase lead increases.

3. An electrical relay according to claim 2, wherein said shaded flux path is further from the energizing electro-magnetic system than is the unshaded flux path.

4. An electrical relay according to claim 1, wherein said shaded pole induction means comprise a magnetic core having two pairs of poles, one pair of which form a magnetic flux path which is shaded and the other pair of which form a magnetic flux path which is unshaded, said capacitance having a value which causes the phase difference between the magnetic flux in the shaded path and that in the unshaded path to have an initial value of 90° when said pole is unsaturated.

5. An electrical relay according to claim 4, wherein said unshaded flux path is further from the energizing electro-magnetic system than is the shaded flux path.

References Cited in the file of this patent

UNITED STATES PATENTS

| | | |
|---|---|---|
| 1,934,526 | Deuser | Nov. 7, 1933 |
| 2,314,231 | McConnell | Mar. 16, 1943 |
| 2,528,240 | Morris | Oct. 31, 1950 |

FOREIGN PATENTS

| | | |
|---|---|---|
| 721,275 | France | Dec. 12, 1931 |